United States Patent [19]

Holmgren

[11] Patent Number: 4,673,121

[45] Date of Patent: Jun. 16, 1987

[54] METHOD FOR CONTINUOUSLY PRODUCING A POWDER FILLED TUBULAR WELDING ELECTRODE

[76] Inventor: Werner Holmgren, Blodboksgatan 8, S-421 74 Västra Frölunda, Sweden

[21] Appl. No.: 792,311

[22] Filed: Oct. 28, 1985

[30] Foreign Application Priority Data

Oct. 29, 1984 [SE] Sweden .............................. 8405400

[51] Int. Cl.⁴ ........................................... H01B 13/06
[52] U.S. Cl. .................................... 228/148; 228/219
[58] Field of Search ............... 228/129, 130, 147, 148, 228/219

[56] References Cited

U.S. PATENT DOCUMENTS

| 3,333,754 | 8/1967 | Catalano et al. | 228/147 |
| 4,269,639 | 5/1981 | Lewis | 228/148 |

FOREIGN PATENT DOCUMENTS

| 55-86634 | 6/1980 | Japan | 228/148 |
| 693937 | 7/1953 | United Kingdom | 228/148 |
| 706371 | 3/1954 | United Kingdom | 228/148 |

Primary Examiner—M. Jordan
Attorney, Agent, or Firm—Cushman, Darby & Cushman

[57] ABSTRACT

A method for continuously producing a powder-filled tubular welding electrode, whereby a metallic band while being fed is formed to a gutter (16) and thereupon to a tube (21), whereby the edges of the gutter are welded together and welding powder is supplied via a conduit (18, 19) to the welded tube, and the welding powder free space of the tube being filled with a protective gas. The object of the invention is to provide a method for continuous production of a tubular welding electrode, especially a tubular welding electrode for welding without external supply of protective gas. The invention is characterized by the fact that the welding powder is introduced in a container (11), which is evacuated of an essential portion of its air content, whereupon the protective gas is introduced into the container until a positive pressure has been reached therein, and the powder-protective gas-mixture thereupon being supplied to the tube (21), whereby in the conduit (18, 19) is maintained a gas pressure, which is somewhat higher than the atmospheric pressure.

6 Claims, 1 Drawing Figure

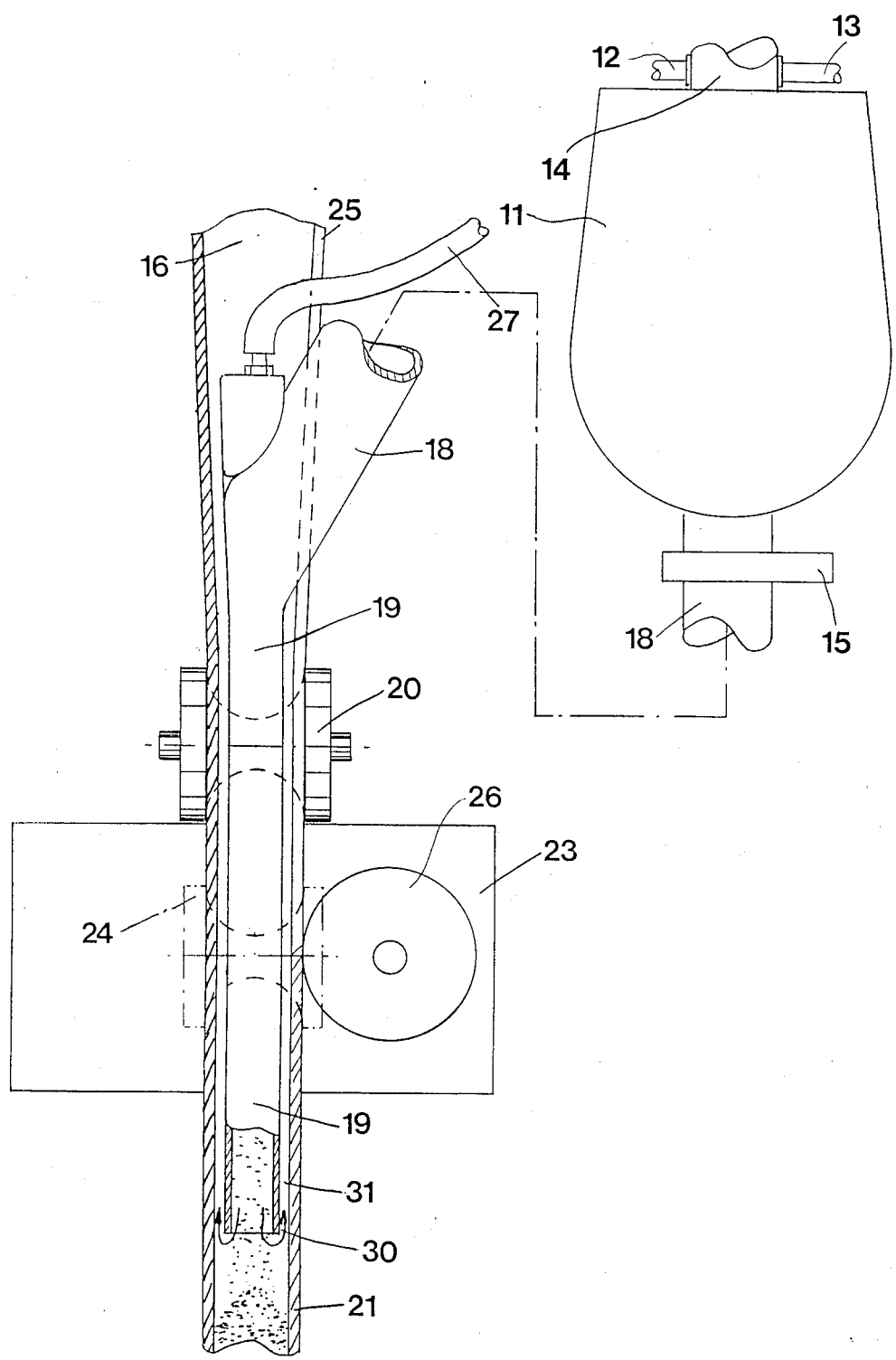

METHOD FOR CONTINUOUSLY PRODUCING A POWDER FILLED TUBULAR WELDING ELECTRODE

The present invention relates to a method for continuously producing a powder filled tubular welding electrode, whereby a metallic band while being fed is formed to a gutter and thereupon to a tube, whereby the edges of the gutter are welded together and welding powder is supplied via a conduit to the welded tube, and the welding powder free space within the tube being filled with a protective gas.

When welding with tubular welding electrodes protective gas or protective gas mixtures are often supplied to the welding position for protecting the welding bath from the ambient atmospheric air. This method requires in addition to the above mentioned welding equipment a particular equipment, which includes a gas container, reducing valves, gas hose etc. The method is used extensively.

It is evident that a welding method without a separate protective gas equipment would essentially simplify the welding equipment and thereby make it less expensive. Such a method is known. There are thereby used tube welding bars with powder mixtures, which when melting will emit a protective gas or gas mixture, which drives away the ambient air around the welding spot. The negative influence on the welding quality from the oxygen and nitrogen of the air is thereby avoided. The welding equipment for this method is certainly more simple but welding electrodes suited therefore develop during welding large volumes of welding smoke, which are troublesome and interfering for the welder. The smoke is furthermore considered inconvenient from an occupational medicinal point of view.

Manufacture of tubular welding bars of the type mentioned in the introduction has become known by the European patent application No. 84850249.8. This manufacturing method provides a tubular welding bar, which is in practice almost hermetically closed. The welding powder in the bar will not be subjected to changes by influence from the ambient atmosphere. During manufacture of this tubular welding bar it has been suggested simultaneously with the supply of the welding powder to supply protective gas, thus that the atmospheric air is prevented from entering the tube during its manufacture and the space between the powder particles at the same time being filled by the protective gas. This continuous manufacturing method has however proved to be insufficient, as the separate gas flow in the tube will obstruct the powder flow and whirl the powder about.

By the Japanese published patent application No. 58-148096 it has become known to fill a tube wound to a coil with a powder, whereupon the tube is evacuated and thereupon is filled with a protective gas. An efficient evacuation of a long, powder filled tube requires a long evacuation time. The manufacture of the tubular welding bar is furthermore not continuous, which will negatively influence the manufacturing costs.

The purpose of the present invention is to provide a method for continuous production of a tubular welding electrode, especially a tubular welding electrode for welding without external supply of protective gas. The invention is characterized thereby that the welding powder is introduced in a container, which is evacuated of an essential portion of its air content, whereupon the protective gas is introduced into the container until a positive pressure has been reached therein, and the powder-protective gas-mixture thereupon being supplied to the tube, whereby there is maintained in the conduit a gas pressure, which is somewhat higher than the atmospheric pressure. The evacuation of the powder filled container shall be so efficient that the remaining air, which then forms part of the powder-protective gas-mixture supplied to the tube in practice will not influence the welding result. According to a preferred embodiment of the invention it is advantageous that the same gas pressure is maintained in the conduit and in the container, when the powder-protective gas-mixture is supplied to the tube. It is furthermore advantageous that the gas pressure is at most 30 mm Hg above the atmospheric pressure, when the powder-protective gas mixture is supplied to the tube. The acceleration of the powder particles in the gas stream moving from the container to the tube avoids a troublesome particle turbulence. At the same time there is achieved a proper fluidizing of the powder particles.

It has further proved to be favourable to set the entire welding powder volume in the container into motion, preferably by stirring, when the container is evacuated and/or when the protective gas is introduced into the container. The time for evacuation of the container and for the admixing of the protective gas with the powder can thereby be considerably reduced.

According to a favourable embodiment according to the invention an inorganic, porous material is introduced into the welding powder before the evacuation for adsorption of the protective gas.

The invention will hereinafter be further described by way of an embodiment with reference to the accompanying drawing, which schematically shows certain parts vital for the invention in a plant for continuous production of powder filled welding electrodes.

During a continuous production of powder filled tubular electrodes the initial material is a metallic band, which is formed to an open gutter. A powder bulk having an accurately defined composition and volume is supplied to this gutter. In the manufacturing method hitherto used this is effected with the gutter arranged in horizontal position, whereupon the gutter is closed by its edges being pressed or folded against each other. A tubular welding electrode manufactured in this manner is not closed and the powder will be subjected to the air and the air humidity.

The plant here described is a development of the device which is further described in the European patent application No. 84850249.8. By aid of this device it is possible to continuously produce a seamless and therefore in practice hermetically closed tubular welding bar.

In the drawing the numeral 16 denotes a metallic band, e.g. a steel belt, which by shaping rolls, which are not shown here, has already been bent to a shape which in cross section is a part-circular or open oval gutter. A powder conveyor 18 opens into the gutter, the conveyor including a considerably smaller filling conduit 19. The gutter 16 is further shaped in a shaping station 20 into a tube 21, the longitudinal seam of which is welded in a welding station 23. The tube 21 is fed at a constant velocity through the welding station 23 and the continuous welding of the joint is effected at the same pace.

The filling tube 19 has a cross-secrtional shape and a dimension which is somewhat smaller than the inner cross section of the tube 21 and it has such a length that it extends beyond the welding station. A conduit 27 from a protective gas source (not shown) is connected to the filling conduit 19.

The welding powder is supplied via a filling conduit 14 to a hermetically closed container 11, which via a conduit 12 is connected to a suction source (not shown) for evacuation of an essential portion of its air content. The container is via a conduit 13 also connected to preferably the same source of protective gas as the conduit 27. When the container has been filled with welding powder the air is first evacuated, whereupon protective gas is supplied under positive pressure. In order to facilitate the evacuation of the air from the powder and the mixing of the powder with the protective gas it is suitable to stir the powder in the container.

When the protective gas is supplied to the container this is made at a positive pressure, which is at one hand favourable for an efficient admixing of the protective gas and the powder and furthermore increases the protective gas content in relation to the air remaining in the container after evacuation. A suitable positive pressure can be arrived at by means of tests. After the mixing the pressure in the container is reduced to the same pressure maintained in the powder conveyor 18 and the filling tube 19 through the conduit 27 by means of pressure steady-state and adjusting means (not shown). This pressure should not be higher than 30 mm Hg. The gas flowing out in the conduit 27 through the filling tube 19 will blow away the air present in the tube through the slot-shaped space 30 between the filling tube 19 and the tube 21.

When a stop valve 15 of the container is opened the powder will fall through the powder conveyor 18 and the filling tube 19 into the welded tube. The low positive pressure will bring about a fluidization of the powder, whereby the powder particles will obtain a considerably increased movability on their way through the filling tube 19.

During the continuous filling of the tube 19, which takes place at the same speed as the tube is fed and welded in the welding station, the atmospheric air will thus be debarred from the tube.

It is possible to supply the protective gas via the container 11 only without the separate conduit 27 to the filling tube. In order to ascertain the desired positive pressure in the entire powder conduit system, it has however shown itself suitable to supply the gas also at a position adjacent the tube 19, as the powder conveyor 18 from constructional point of view is rather long.

An inorganic, porous material having a good gas absorption ability is supplied to the powder. The choice and volume of suitable material is determined not only by its gas adsorption ability but to a high extent also by the influence of the material upon the welding properties and the welding quality.

What I claim is:

1. In a method for continuously producing a powder filled tubular welding electrode wherein a metallic band while being fed longitudinally of itself is formed into a gutter and thereafter is formed into a tube by welding the edges of the gutter and wherein welding powder is supplied via a filling conduit opening into said tube, the improvement comprising introducing the welding powder into a container which is evacuated of an essential portion of its air content, introducing protective gas into the container until a positive gas pressure has been reached therein, and supplying gas-powder mixture from the container through said filling conduit to said tube while maintaining gas pressure in said conduit which is somewhat higher than the atmospheric pressure.

2. A method as in claim 1 wherein the same gas pressure is maintained in the conduit and in the container when gas-powder mixture is supplied to the tube.

3. A method as in claim 1 wherein the gas pressure is at most 30 mm Hg above the atmospheric pressure.

4. A method as in claim 1 wherein the entire volume of welding powder in the container is brought into motion when the container is evacuated and/or when the protective gas is supplied to the container.

5. A method as in claim 4 wherein the welding powder volume is brought to motion by stirring.

6. A method as in claim 1 wherein an inorganic, porous material is supplied to the welding powder before the evacuation.

* * * * *